United States Patent
Aguilar, Jr. et al.

(10) Patent No.: US 7,340,361 B2
(45) Date of Patent: Mar. 4, 2008

(54) METHOD AND APPARATUS FOR ANALYZING COMPUTER SYSTEM PERFORMANCE AND PROPOSING HARDWARE COMPONENT UPGRADES

(75) Inventors: Maximino Aguilar, Jr., Georgetown, TX (US); David J. Erb, Austin, TX (US); Michael Stan Gowen, Georgetown, TX (US); Sidney J. Manning, Austin, TX (US); James Michael Stafford, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 11/360,907

(22) Filed: Feb. 23, 2006

(65) Prior Publication Data

US 2007/0198216 A1    Aug. 23, 2007

(51) Int. Cl.
*G06F 19/00*    (2006.01)
(52) U.S. Cl. .......................... 702/90; 714/25; 700/108
(58) Field of Classification Search ............... 702/186, 702/182–185, 90, 198, 199; 714/14, 25; 700/9, 21, 29, 49, 108, 117, 174
See application file for complete search history.

(56) References Cited

U.S. PATENT DOCUMENTS 7,139,999 B2 *   11/2006   Bowman-Amuah ......... 717/101

\* cited by examiner

*Primary Examiner*—Edward Raymond
(74) *Attorney, Agent, or Firm*—Duke W. Yee; D'Ann N. Rifai; Theodore D. Fay, III

(57) ABSTRACT

A method and apparatus is provided for analyzing performance of a computer or data processing system, during the time that a specified task is running on the system. The analysis is used to furnish a system user with a list of proposed hardware component upgrades that would improve system performance in various respects, each being accompanied by a parameter value indicating the improvement a particular upgrade would provide. Usefully, listed upgrades are made available over the Internet, for purchase by system users. In an embodiment directed to a method, for use with a computer system comprising a configuration of hardware components, selected hardware components are monitored as the system performs a specified task. This is done to acquire statistics representing the operation of respective selected components. The statistics are processed, to identify at least one selected component that impedes the system in performing the task. An upgrade of the identified component is then proposed, together with an indication of the improvement that would result if the upgrade is made.

9 Claims, 2 Drawing Sheets

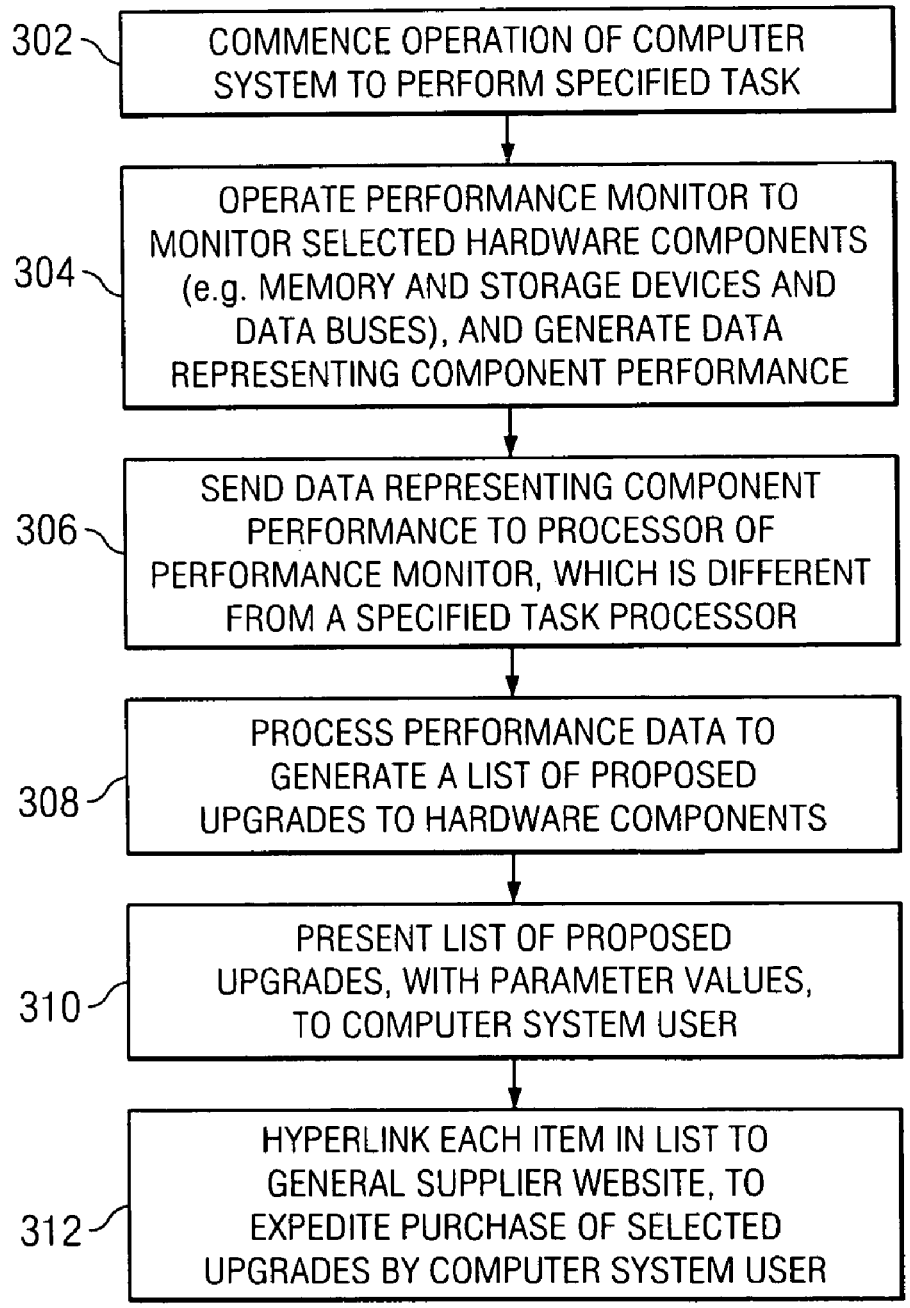

METHOD AND APPARATUS FOR ANALYZING COMPUTER SYSTEM PERFORMANCE AND PROPOSING HARDWARE COMPONENT UPGRADES

BACKGROUND OF THE INVENTION

1. Field of the Invention

The invention generally pertains to a method and apparatus for monitoring operation of selected hardware components of a computer system, as the system performs a specified task. More particularly, the invention pertains to a method of the above type wherein one or more upgrades are proposed for a component, in order to improve system performance in carrying out the task. In a useful embodiment pertaining to a method of the above type, multiple proposed upgrades for a component, accompanied by their respective anticipated effects, may be offered for sale over the Internet or the like.

2. Description of the Related Art

Frequently, a user of a computer or data processing system seeks to improve performance of the system in carrying out a specified task. For example, a user may desire to reduce the time required to compile a particular program, such as from a currently required time of 3.0 hours. In a common solution to this problem, the user would first determine that a particular system component was acting as a significant bottleneck or impediment, when the task of interest was being performed. This determination would be based on the skills and insights of the user. After making the determination, the particular component would be replaced with a hardware upgrade. Components typically considered for upgrade in a computer system, in order to improve system operating characteristics, could include RAM or other memory, hard drive storage capacity, and PCI or other data buses. As used herein, the term "upgrade" refers to a hardware component that performs the same function as the system component it is supplementing or replacing, but with substantially greater capability.

Computer systems of the type described above comprise intricate configurations of complex components. As a result, even if a system bottleneck is overcome by the above approach of selecting a hardware component for upgrade, the upgrade may only lead to discovery of a further bottleneck. As an example, it could be determined that the time required to load data into a hard drive would be significantly decreased by replacing a PCI bus with a PCI-X bus. This would seem reasonable, since a PCI-X bus can carry data up to 20 times faster than a PCI bus. However, after upgrading the bus, it might be discovered that the current hard drive component does not load data fast enough to significantly reduce data loading time. This occurs notwithstanding the faster data flow rate provided by the upgraded bus. Accordingly, the best solution would be to upgrade the hard drive component as well. For example, a Redundant Array of Independent Disks (RAID) could be used for the hard drive, to significantly increase the data loading speed.

Therefore, to assist a user in making improvements in a computer system, it would be useful to conduct an analysis of different system components, as the system performs a task of interest. The user could then be provided with a list showing alternative upgrades to one or more of the hardware components, that would improve or enhance various system operating characteristics. Each listed upgrade would usefully be accompanied by a parameter value, which clearly indicated the result to be expected from the particular upgrade. Usefully also, the analysis would not affect or interfere with the system, as it was performing the task of interest.

SUMMARY OF THE INVENTION

The invention provides a method and apparatus for analyzing performance of a computer or data processing system, during the time that a specified task is running on the system. Embodiments of the invention furnish a system user with a list of proposed hardware component upgrades that would improve system performance in various respects. Each listed upgrade is accompanied by a parameter value that indicates the result or improvement the particular upgrade will provide. In a useful embodiment, listed upgrades are made readily available over the Internet, for purchase by system users. In an embodiment of the invention directed to a method, for use with a computer system comprising a configuration of hardware components, selected hardware components are monitored as the system performs a specified task. This is done to acquire statistics that represent the operation of each of the selected components. The method further comprises processing the statistics to identify at least one of the selected components that hinders or impedes the system in the performance of the task. At least one upgrade of the identified component is then proposed, together with a parameter value or other indication of the improvement in task performance that would result, if the upgrade was implemented.

BRIEF DESCRIPTION OF THE DRAWINGS

The novel features believed characteristic of the invention are set forth in the appended claims. The invention itself, however, as well as a preferred mode of use and further objectives and advantages thereof, will best be understood by reference to the following detailed description of an illustrative embodiment when read in conjunction with the accompanying drawings, wherein:

FIG. 3 is a flow chart showing respective steps for an embodiment of the invention.

DETAILED DESCRIPTION OF THE PREFERRED EMBODIMENT

Figure 1:
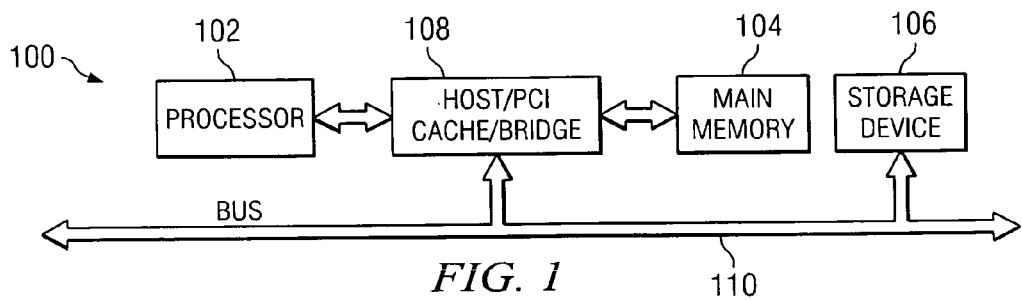
FIG. 1 is a block diagram showing a data processing system that can usefully be employed as a system performance analysis tool, in implementing an embodiment of the invention.

Referring to FIG. 1, there is shown a block diagram of a processing system 100 which may be used in implementing embodiments of the present invention. Processing system 100 exemplifies a computer device, in which code or instructions for implementing the processes of the present invention may be located. In a useful embodiment, processing system 100 is built into the same chip that contains the processor of a computer system to be monitored by system 100, as described herein.

Processing system 100 may employ a peripheral component interconnect (PCI) local bus architecture, although other bus architectures may alternatively be used. FIG. 1 shows a processor 102 and main memory 104 connected to a PCI local bus 110 through a Host/PCI bridge 108. PCI bridge 108 also may include an integrated memory controller and cache memory for processor 102. A storage device 106 is similarly connected to bridge 108 through bus 110.

An operating system runs on processor 102 and is used to coordinate and control various components of processing system 100. Instructions for the operating system, and for applications or programs to implement embodiments of the invention, are located on storage device 110, and may be loaded into main memory 104 for execution by processor 102.

Figure 2:
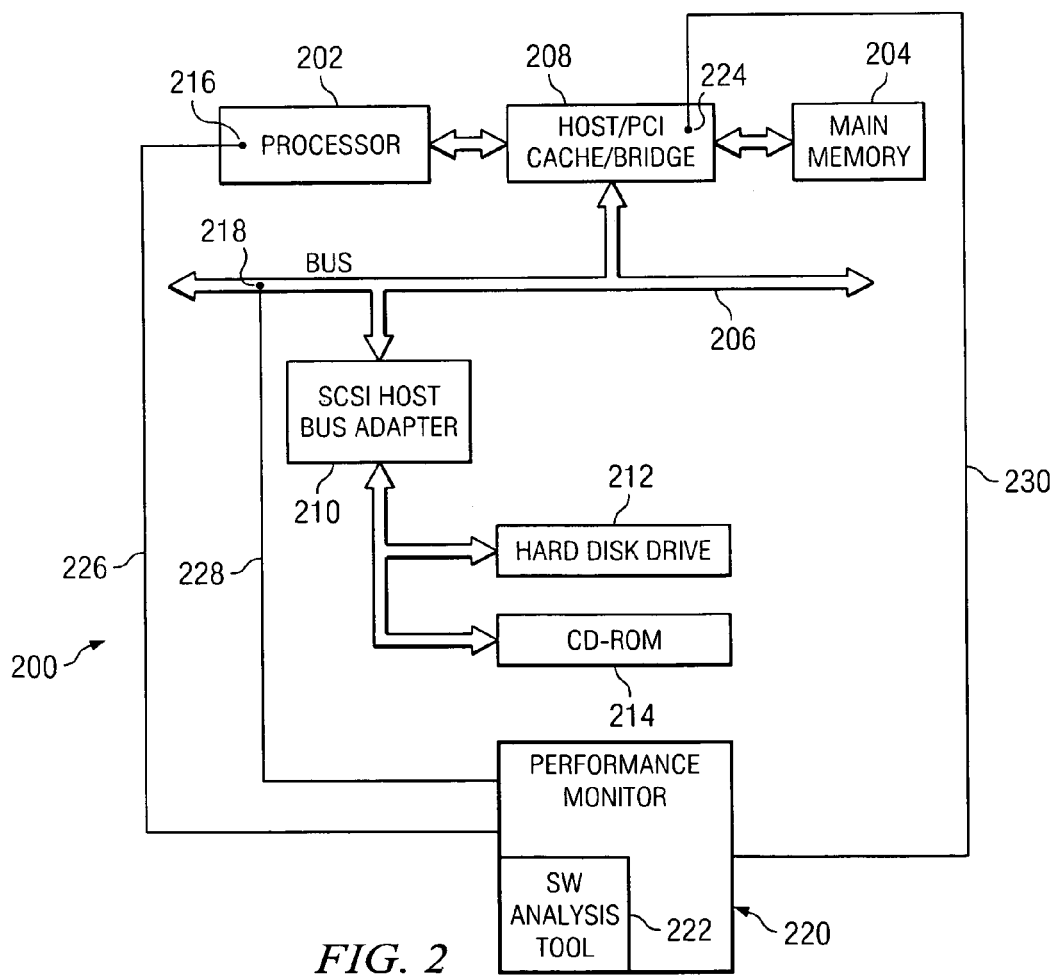
FIG. 2 is a block diagram showing the analysis tool of FIG. 1 connected to conduct an analysis of a computer or other data processing system, in accordance with an embodiment of the invention.

Referring to FIG. 2, there is shown a block diagram of a generalized data processing or computer system 200 that is to be monitored by a performance monitor 220, in accordance with an embodiment of the invention. The performance monitor 220 may usefully comprise a hardware device such as processing system 100, adapted to carry out functions as described herein.

FIG. 2 shows computer system 200 provided with a processor 202 and a main memory 204, such as a random access memory (RAM), connected to a PCI bus 206 through a host/PCI bridge 208. Bridge 208 also includes a cache memory for processor 202.

FIG. 2 further shows a small computer system interface (SCSI) host bus adapter 210 connected to PCI bus 206 by direct component connection. SCSI host bus adapter 210 provides a connection for hard disk drive 212, and also for CD-ROM drive 214. An operating system runs on processor 202, to coordinate and control various components of computer system 200. Instructions for the operating system and for applications or programs are located on storage devices, such as hard drive 212, and may be loaded into main memory 204 for execution by processor 202. The computer system 200 of FIG. 2 may be specifically adapted, to perform tasks or functions of various types.

Referring further to FIG. 2, there is shown performance monitor 220 coupled to analyze the performance of various components of computer system 200, as system 200 is being run to carry out a specified task. More particularly, performance monitor 220 monitors the system in real time to collect performance data. Monitor 220 is provided with a system performance analysis tool 222, which is a software program that is run afterwards to analyze the collected data. The software tool 222 can get small amounts of data directly from performance monitor 220. Monitor 220 flushes data to memory 204 for larger quantities. Software tool 222 does not communicate with hardware other than performance monitor 220 and its associated memory.

FIG. 2 further shows probes 216, 218 and 224 embedded in respective components of computer system 200. Specifically, probe 216 is embedded in processor 202. Probe 218 is embedded in bus 206, so that performance monitor 220 has access to the bus controller. Probe 224 is embedded in the host/PCI bridge 208, which contains the memory controller for memory 204. These probes are shown by way of example only, and numerous other probes may be embedded in other hardware components of system 200. FIG. 2 shows probes 216-218 and 224 linked to performance monitor 220 by means of transmission paths 226-230, respectively.

The probes 216-218 and 224 track or monitor operation of their respective components, as computer system 200 performs the specified task. Related data signals, representing information such as the timing of events, count values, hard drive loading times and data flow rates, are then sent back to performance monitor 220 from the monitored components. The data signals could also represent memory overflow or page fault conditions. A processor contained in monitor 220 and operated by the software tool 222 then processes this data, to generate statistics that enable a detailed analysis of the bottlenecks, impediments or delays in system 200, as well as potential bottlenecks.

After the monitored data has been processed, performance monitor 220 produces a report that proposes one or more upgrades to one or more monitored hardware components of system 200. Each upgrade listed on the report is accompanied by a parameter value indicating an improvement expected in the performance of system 200, if the upgrade is made. As an example, if computer system 200 requires 3.0 hours to compile a certain software program, performance monitor 220 could be used to monitor system 200, and then provide alternative upgrade proposals to reduce compilation time. A partial report produced by monitor 220 may appear as follows:

| | |
|---|---|
| 3.0 hrs. | do nothing |
| 2.7 hrs. | add 512 MB of memory |
| 2.6 hrs. | add 1 GB of memory |
| 2.9 hrs. | add RAID scsi card |
| 1.3 hrs. | add RAID and 512 MB |

The above report indicates that adding a RAID fixes a bottleneck associated with the data loading of the hard drive. However, this action alone simply moves the bottleneck to system memory. The report further indicates that the best approach would be to upgrade both the hard drive and the memory. This will provide a much better performance boost than the sum of the individual upgrade improvements.

In a very useful embodiment, the performance monitor 220 is built into a chip that also includes the processor for computer system 200. Since the monitor 220 has a separate processor, its component monitoring activities do not interfere with task performance operations of computer system 200. Usefully also, a list of proposed upgrades generated by monitor 220 may be readily hyperlinked, or otherwise sent over the Internet, to the web site of a supplier of the listed hardware upgrades. This would enable a user of computer system 200 to easily and conveniently purchase selected upgrades, in order to improve performance of the specified path.

Referring to FIG. 3, there is shown a flow chart summarizing respective steps in an embodiment of the invention. At step 302, computer system 200 commences performance of a specified task. As this occurs, performance monitor 220 tracks or monitors operation of selected hardware components of system 200, as indicated by step 304. Data representing performance of the selected components is generated and sent to the processor of monitor 220, as shown by step 306. This data, acquired by probes such as 216-218 and 224 as described above, represents information such as data flow rates, rates at which data is transferred into and out of storage devices, and occurrences of memory faults.

Referring further to FIG. 3, at step 308 performance data is processed by means of the analysis tool 222, in order to produce a list of proposed upgrades to certain hardware components of system 200. Generally, the data that monitor 220 receives from its various probes informs monitor 220 of the times at which respective events occur in computer system 200, as the system performs the specified task. Monitor 220 is also provided with the relationships among the respective events, and how the timing of one event affects another event. From these relationships and the data indicating the timing of respective events, analysis tool 222 is able to identify bottlenecks in system 200, that is, hardware components that significantly delay or otherwise impede over-all system performance of the specified task. The information available to monitor 220 also enables analysis tool 222 to select upgrades for respective bottleneck components. A parameter value is computed for each selected upgrade, such as the over-all time that system 200 would take to perform the specified task, if the corresponding upgrade was installed.

As shown by step 310 of FIG. 3, the list of upgrades is furnished or presented to a user of computer system 200. As described above, it could be very useful to hyperlink each item in the list to a supplier web site, to expedite or simplify purchase of an upgrade that was selected by the user. This capability is shown at step 312 of FIG. 3.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for use with a computer system comprising a configuration of hardware components, said method comprising the steps of:

monitoring selected hardware components of said system as said system performs a specified task, in order to acquire statistics representing the operation of each of said selected hardware components during said task;

processing said statistics to identify at least one of said selected hardware components that in its operation is found to impede said system in the performance of said task, wherein an identified component is formed; and proposing at least one upgrade of said identified component that would cause the performance of said task by said system to be improved, each proposed upgrade being accompanied by a parameter value, wherein said proposing step comprises proposing a plurality of proposed alternative upgrades for said identified component, wherein the parameter value for a particular proposed alternative upgrade indicates an anticipated effect on task performance if the particular proposed alternative upgrade is made to said identified component.

2. The method of claim 1, wherein:
said plurality of proposed alternative upgrades are respectively offered for sale to a user of said system.

3. The method of claim 1, wherein: said plurality of proposed alternative upgrades are offered for sale over the Internet.

4. The method of claim 3, wherein:
said plurality of proposed alternative upgrades for said identified component are offered for sale together with other upgrades, wherein said other upgrades are respectively proposed for other hardware components of said system besides said identified component.

5. The method of claim 1, wherein:
said selected hardware components include at least specified memory devices, storage devices, and data buses.

6. The method of claim 1, wherein:
said statistics are processed independently of the performance of said task by said computer system.

7. The method of claim 6, wherein:
said computer system is provided with a first processor for use in performing said task; and
a second processor, residing proximate to said first processor, is provided for processing said statistics and proposing said at least one upgrade.

8. The method of claim 7, wherein:
said first and second processors are heterogeneous, and are incorporated into a single chip.

9. The method of claim 8, wherein:
probes connected to said second processor are respectively embedded in each of said selected hardware components, in order to monitor said selected hardware components during performance of said task, and to provide said second processor with information associated with said statistics.

* * * * *